US008405022B2

(12) United States Patent
Hersman

(10) Patent No.: US 8,405,022 B2
(45) Date of Patent: Mar. 26, 2013

(54) THERMAL MANAGEMENT TECHNOLOGY FOR POLARIZING XENON

(75) Inventor: F. William Hersman, Durham, NH (US)

(73) Assignee: University of New Hampshire, Durham, NH (US)

( * ) Notice: Subject to any disclaimer, the term of this patent is extended or adjusted under 35 U.S.C. 154(b) by 12 days.

(21) Appl. No.: 13/066,151

(22) Filed: Apr. 7, 2011

(65) Prior Publication Data

US 2011/0260076 A1 Oct. 27, 2011

Related U.S. Application Data

(63) Continuation-in-part of application No. 11/903,161, filed on Sep. 20, 2007, now Pat. No. 7,928,359.

(60) Provisional application No. 60/846,043, filed on Sep. 20, 2006.

(51) Int. Cl.
*H01S 3/04* (2006.01)

(52) U.S. Cl. .......... 250/251; 250/492.1; 372/36; 372/55

(58) Field of Classification Search ........................ None
See application file for complete search history.

(56) References Cited

U.S. PATENT DOCUMENTS 3,024,009 A 3/1962 Booth, Jr. et al.
3,378,351 A 4/1968 Hashman et al.
3,904,272 A 9/1975 Straka
4,386,950 A 6/1983 Bell et al.
4,755,201 A 7/1988 Eschwey et al.
4,793,357 A 12/1988 Lindstrom
4,977,749 A 12/1990 Sercel
5,145,001 A 9/1992 Valenzuela
5,545,396 A 8/1996 Albert et al.
5,617,859 A 4/1997 Souza et al.
5,642,625 A * 7/1997 Cates et al. .................... 62/55.5
5,809,801 A 9/1998 Cates et al.
5,860,295 A 1/1999 Cates et al.
5,934,103 A 8/1999 Ryan et al.
6,305,190 B1 10/2001 Driehuys et al.
6,427,452 B2 8/2002 Zollinger et al.
6,434,284 B1 8/2002 Savchenko
6,551,559 B1 * 4/2003 Cates et al. ................... 422/547
6,666,047 B1 * 12/2003 Shah et al. ...................... 62/637
6,949,169 B2 * 9/2005 Hersman et al. .............. 204/155
6,963,199 B2 11/2005 Sato
7,287,390 B2 * 10/2007 Bolam ........................... 62/55.5
7,495,435 B2 * 2/2009 Appelt et al. ................. 324/300
7,719,268 B2 * 5/2010 Hersman et al. .............. 324/304

(Continued)

FOREIGN PATENT DOCUMENTS

WO WO 99/34189 7/1999

OTHER PUBLICATIONS

Driehuys, et al., High-volume production of laser-polarized Xe, Applied Physics Letters, American Institute of Physics, vol. 69, No. 12, Sep. 16, 1996, p. 1668-1670, New York.

(Continued)

*Primary Examiner* — David A Vanore
*Assistant Examiner* — Andrew Smyth
(74) *Attorney, Agent, or Firm* — Paul C. Remus; Devine, Millimet & Branch

(57) ABSTRACT

A polarizing apparatus has a thermally conductive partitioning system in a polarizing cell. In the polarizing region, this thermally conductive partitioning system serves to prevent the elevation of the temperature of the polarizing cell where laser light is maximally absorbed to perform the polarizing process. By employing this partitioning system, increases in laser power of factors of ten or more can be beneficially utilized to polarize xenon. Accordingly, the polarizing apparatus and the method of polarizing $^{129}Xe$ achieves higher rates of production.

10 Claims, 11 Drawing Sheets

U.S. PATENT DOCUMENTS

| | | | | |
|---|---|---|---|---|
| 2002/0107439 | A1* | 8/2002 | Hersman et al. | 600/410 |
| 2003/0109058 | A1* | 6/2003 | Bolam | 436/173 |
| 2004/0035182 | A1* | 2/2004 | Kadlecek | 73/23.2 |
| 2005/0001615 | A1 | 1/2005 | Sato | |
| 2005/0245815 | A1* | 11/2005 | Hersman et al. | 600/410 |
| 2006/0269614 | A1* | 11/2006 | Nelson et al. | 424/600 |
| 2007/0080684 | A1* | 4/2007 | Appelt et al. | 324/304 |
| 2008/0093543 | A1 | 4/2008 | Hersman | |
| 2009/0261822 | A1* | 10/2009 | Appelt et al. | 324/304 |

OTHER PUBLICATIONS

Rosen, et al. Polarized Xe optical pumping/spin exchange and delivery system for magnetic resonance Spectroscopy and imaging studies. Review of Scientific Instruments, American Institute of Physics, vol. 70, No. 2, Feb. 1999, p. 1546-1552, New York.

* cited by examiner

THERMAL MANAGEMENT TECHNOLOGY FOR POLARIZING XENON

CROSS-REFERENCE TO RELATED APPLICATIONS

The present application is a continuation-in-part of patent application Ser. No. 11/903,161 filed Sep. 20, 2007, now U.S. Pat. No. 7,928,359 which is incorporated herein by reference and which claims the benefit of Provisional Patent Application No. 60/846,043 filed Sep. 20, 2006, which is also incorporated herein by reference.

TECHNICAL FIELD

The present invention relates to polarization of Xenon. More specifically, it relates to a means to increase the rate of polarization of Xenon by using multiple heat exchanger channels.

BACKGROUND OF THE INVENTION

Hyperpolarized Xenon ($^{129}$Xe) is becoming the contrast agent of choice in a broad spectrum of diagnostic protocols. Specifically, hyperpolarized $^{129}$Xe offers extraordinary potential as a contrast agent for magnetic resonance imaging ("MRI").

$^{129}$Xe is hyperpolarized by spin-exchange optical pumping using a gas mixture of Xe (with natural abundance of $^{129}$Xe or enriched in $^{129}$Xe), a quenching gas (nitrogen or hydrogen), and optional buffer gas (typically helium). In addition to these gases, the flowing gas mixture acquires a vapor of alkali metal during the polarization process. $^{129}$Xe comprises only a fraction of the total gas mixture.

The system of hyperpolarizing uses a polarizing cell, polarized laser light, and a magnetic field. The polarizing cell has at least a pair of openings defining an entrance and exit to allow a flowing gas mixture into and out of the polarizing cell. The laser is positioned to allow laser light to enter through a transparent window into the polarizing cell, most beneficially in a direction opposite the flow of the gas mixture. The magnetic field is oriented along (or against) the direction of laser propagation.

A number of steps are involved in hyperpolarizing $^{129}$Xe. The first step requires moving a flowing mixture of gases through the polarizing cell, the gas at least containing $^{129}$Xe and containing (or acquiring) the vapor of at least one alkali metal. The second step is propagating circularly polarized laser light through the polarizing cell such that it illuminates the flowing gas mixture. The final step is immersing the polarizing cell in a magnetic field. These steps can be initiated in any order, although the gas entering and then leaving the cell, the propagating laser light, and the magnetic field immersion must be concurrently active for polarization to occur and be made available for beneficial uses.

SUMMARY OF THE INVENTION

Unfortunately, there are deficiencies to the above-described polarizing apparatus, particularly when one considers increasing the polarized gas output, including concerns with the temperature of the gas and the effect on the production of polarized $^{129}$Xe. In particular, the production of polarized $^{129}$Xe at an increased rate should beneficially utilize increased laser power, which is absorbed in the gas and conducted to the walls of the cell. Either the volume must be increased or the specific laser absorption must be increased.

Both strategies result in increased temperature of the gas mixture. For the case where the dimension of the cell transverse to the laser beam is increased, the increased distance from the center of the cell to the edge lowers the thermal conductance and increases the gas temperature at the center. It is recognized that it is commonly practiced that the temperature of the gas mixture is elevated from room temperature in order to achieve an optimal rubidium vapor density in the flowing gas mixture. However, it is detrimental to the operation of the polarizer if laser absorption is permitted to cause elevation in temperature significantly beyond that optimal temperature. Higher gas temperatures reduce the spin-exchange rate between the alkali vapor atoms and the xenon nuclei. Consequently, $^{129}$Xe polarization at increasingly high laser power is limited by the resulting elevated temperature of the gas mixture.

Another beneficial role which the walls of the cell will perform in some polarizing systems is the condensation and extraction of the alkali vapor from the flowing gas mixture before it exits the cell and leaves the illuminating presence of the laser. If the gas mixture leaves the cell while still fully saturated with alkali vapor, the vapor will lose its polarization and begin to transfer that lower polarization to the highly polarized xenon nuclei, reducing their polarization. Some polarization systems therefore have an extension of the polarizing cell near the gas exit (and laser entrance) whose wall is maintained at a temperature much lower than that of the polarizing section of the cell. The alkali metal vapor which comes in contact with this wall due to diffusion will condense on the wall, decreasing the alkali vapor density in the flowing gases. Increasing the transverse dimension of the polarizing cell increases the distance over which alkali vapor atoms must diffuse in order to condense on the walls. For the alkali vapor extraction process to evolve to a similar state of completion, the length of the lower temperature (near room temperature) section would have to be increased. Increasing the physical length of the apparatus could become impractical.

Another limitation of the current practice is the choice of material for the polarizing cell. At least one end of the cell must be fabricated from glass to allow the polarized laser light to enter. It is also known that glass provides a beneficial surface that preserves the polarization of xenon once it is produced. Consequently polarizing cells are routinely fabricated from entirely glass. The low thermal conductivity of glass becomes a limitation to producing larger amounts of hyperpolarized xenon by absorbing more laser power.

In contrast to the above-described polarizing apparatus, an improved polarizing apparatus has a heat transfer device for stabilizing the temperature of the flowing gases to a temperature close to the optimal temperature by allowing for the removing of heat from one region of a polarizing cell of the polarizing apparatus. Furthermore, an additional improvement is that a similarly designed extension of that improvement will allow for the simultaneous cooling of the flowing gases and extraction of the alkali vapor while in the presence of the laser. These improvements are enabled by the novel transition from polarizing cells fabricated from glass to a choice of materials that offers higher thermal conductivity.

It is a purpose of the present invention to stabilize the temperature of the gas mixture in the polarizing cell by conducting heat deposited in the gases to and from a thermal reservoir, allowing the absorbed laser light to increase the rate of production of polarized $^{129}$Xe.

In accordance with one aspect of the present invention, a polarizing cell has an enclosure having one or more side walls defining an interior and an interior surface for each of the one or more side walls. The enclosure has at least a pair of openings including an entrance and an exit to allow a gas mixture to pass through the interior. The polarizing cell has at least one window transparent to laser light. At least one part of the polarizing cell is made of a material with thermal conductivity higher than glass.

In one embodiment, at least one partitioning device is carried in the interior of the enclosure for extracting heat from a gas mixture.

In an embodiment, the partitioning device is a column structure having a plurality of planar walls defining a plurality of channels to allow a gas mixture to pass through.

In an embodiment, the partitioning device is one or more fins with walls that may extend partially or fully into the interior of the enclosure.

In an embodiment, the enclosure and the at least one partitioning device are made of a thermal conductive material. The enclosure and the partitioning device may be made of copper or aluminum.

In an embodiment, the enclosure and the at least one partitioning device are made of a thermal conductive material, and a portion of the interior surfaces of the side walls of the enclosure and a portion of the walls of the at least one partitioning device have a thin glass cladding.

The partitioning device is located in between the entrance and exit to the interior and extends generally from entrance opening to the exit opening.

In embodiments where the interior of the column is partitioned into channels, some of these channels will have an entrance located closer to the location where the gas enters the column, and/or an exit close to where the gas exits. In order to prevent some channels from having a greater pressure drop from entrance to exit than others and therefore flowing gas at a faster rate than other channels, some embodiments may have a baffle plate with flow restricting orifices that distribute the gas flow equally to the separate flow channels.

Some embodiments of this aspect of the invention include the enclosure having a pair of heat transferring portions and an interposed transition region. The transition region has a reduced thermal conductivity.

In an embodiment, the partitioning device, a heat transferring portion, has a pair of heat transferring portions and an interposed transition region, the transition region having a reduced thermal conductivity Some embodiments of the invention include a polarizing apparatus including a polarizing cell having an enclosure formed of thermal conductivity material, a laser propagating light and an optical arrangement. The enclosure has at least a pair of multiple openings and at least one window transparent to laser light. A partitioning device or heat transfer device is carried in the interior of the enclosure for transferring heat from a gas mixture to the enclosure. The laser propagating light, at the absorption wavelength of the alkali metal vapor, is directed through at least one transparent window into the polarizing cell in a direction at least partially opposite to the flow of the gas mixture. The optical arrangement causes the laser light to be substantially circularly polarized.

In an embodiment, the polarizing apparatus includes a gas mixture, at least containing a polarizable nuclear species, at least one alkali metal vapor, and at least one quenching gas, flowing through the cell. A thermal reservoir such as an oven or thermal bath of the apparatus at least partially containing the polarizing cell.

Some embodiments of invention include a polarizing cell having a nonferrous enclosure with an interior and at least two openings for flowing gas to pass through the enclosure. The window in the enclosure allows laser light to at least partially illuminate the interior. The window is maintained at a temperature substantially lower than most of the enclosure.

In some embodiments, the polarizing cell is more than five times greater in length than diameter. The oven maintains a temperature of over 150° C.

In some embodiments, the heat transfer device is a column structure having a plurality of planar walls defining a plurality of channels to allow a gas mixture to pass through. The heat transfer device is located in between the entrance and exit to the interior and spaced from the interior and in proximity to the exit.

Some embodiments of this aspect of the invention include a polarizing process including moving a flowing mixture of gas, at least containing a polarizable nuclear species and vapor of at least one alkali metal. Laser light is propagated in a direction that intersects the flowing gas mixture. The flowing gas mixture passing in a polarizing cell. The temperature of the flowing gas mixture is being stabilized by using a partitioning device for transferring the heat. The polarizing cell is immersed in a magnetic field.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

An improved polarizing apparatus having a polarizing cell with thermally conductive side walls and a thermally conductive partitioning device which serves to prevent the elevation of the temperature of the polarizing cell where laser light is maximally absorbed to perform the polarizing process. By employing this partitioning system, increases in laser power of factors of ten or more can be beneficially utilized to polarize xenon. Accordingly, conventional polarizing apparatus and the method of polarizing $^{129}$Xe fail to achieve rates of production achieved by the method described below.

Figure 1:
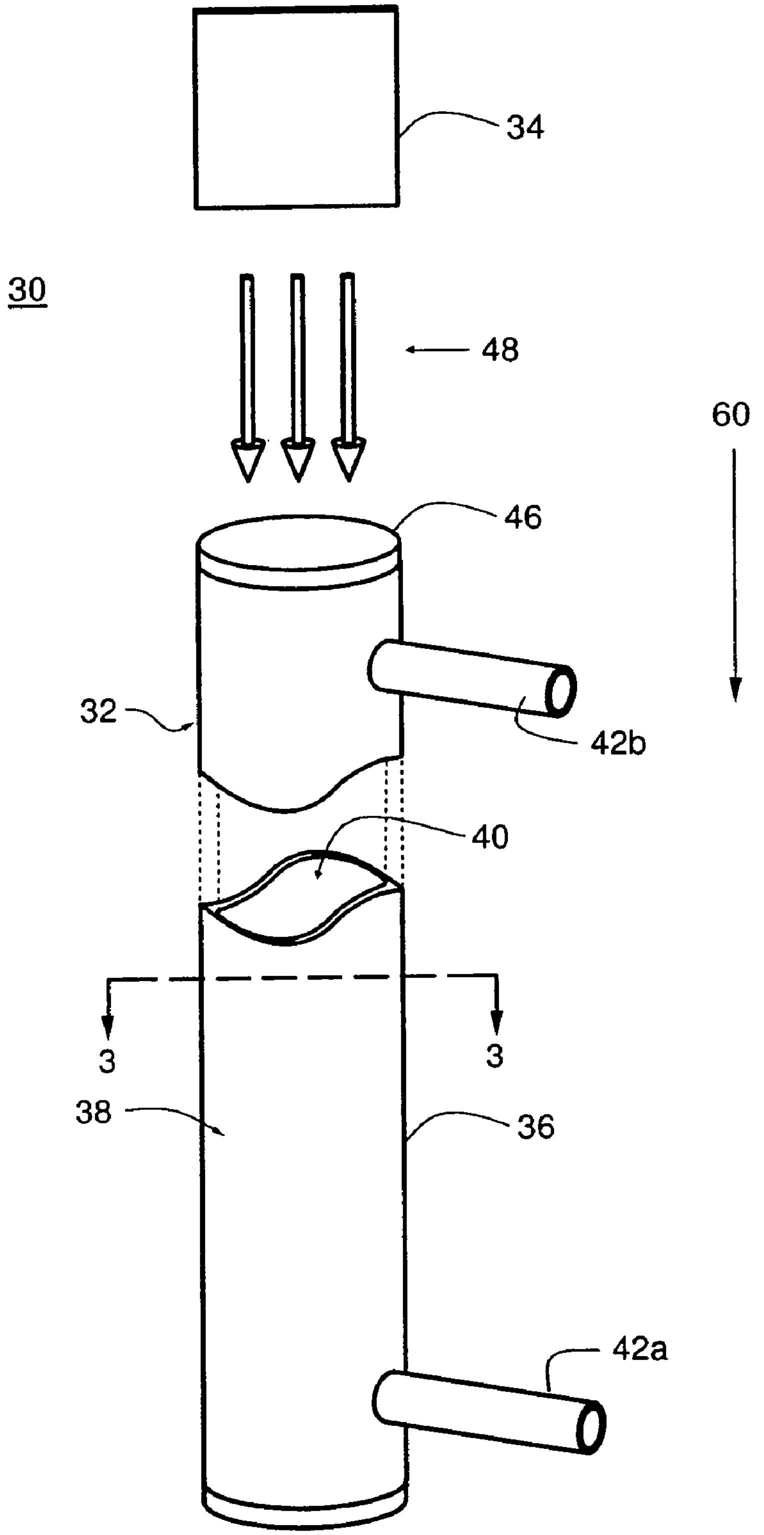
PRIOR ART FIG. 1
FIG. 1 shows a schematic diagram of a polarizing cell of the prior art.

Referring to FIG. 1, a prior art polarizing apparatus 30 having a polarizing cell 32 and a laser 34 is shown. The polarizing cell 32 has a non-magnetic enclosure 36 having a circular side wall 38 defining an interior 40. The circular side wall 38 has at least two openings, an entrance 42*a* and an exit 42*b* for flowing a gas mixture 44 from the entrance 42*a* to the exit 42*b*. The polarizing cell 32 also includes a window 46 in the enclosure 36. The window 46 is transparent to circularly polarized laser light 48 from the laser 34, which is propagated in a direction opposite to the direction of flow of the gas mixture.

Figure 2:
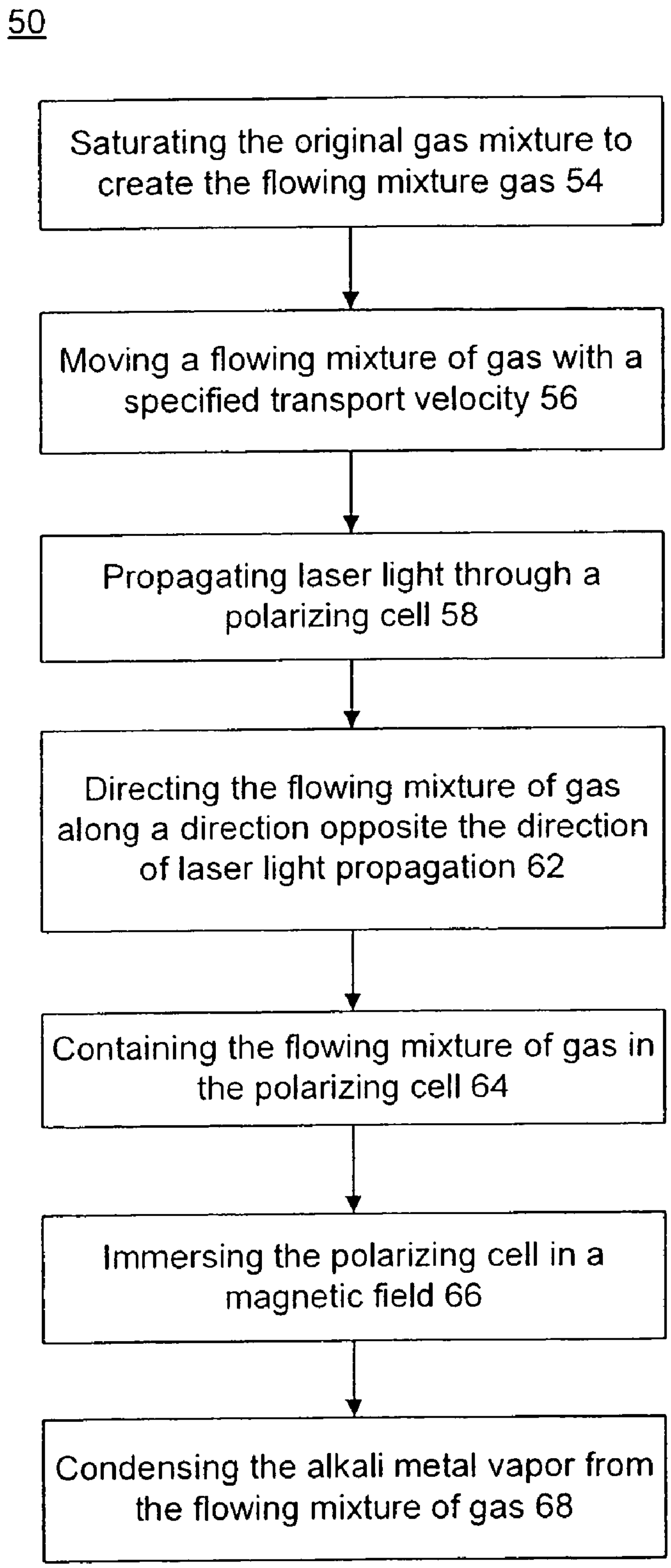
FIG. 2 is a flow diagram of an embodiment of a polarization method.

Referring to FIG. 2, a flow diagram of a polarization process or method 50 is shown. The polarizing process 50 involves a number of steps. One optional step is saturating an original gas mixture 52 with an alkali metal vapor to create the flowing gas mixture 44 prior to entering the polarizing cell 32 of FIG. 1, which is represented by block 54. The next step requires moving 12 a flowing mixture of gas 44, the flowing mixture of gas 44 at least containing a polarizable nuclear species and having or accumulating within the cell, a vapor of at least one alkali metal, is represented by block 56.

In an embodiment, the gases are flowing with a velocity that can be defined a characteristic average transport time from entrance to exit. While the flow is not uniform from side to center (in fact in some apparatus a Poiseuille flow becomes well established) the transport time can be defined as the cell volume divided by the gas volumetric flow rate (corrected for the temperature). Other time constants are important to the operation of the polarizer. For the alkali metal vapor to fully saturate the center of the flowing gas mixture, the time constant for rubidium to diffuse from the pools at the warm surface of the cell wall to the center must be considerably less than the transport time of the gas through the section of the polarizing cell containing the liquid rubidium. If the polarization level of the extracted xenon gas is to benefit from higher levels of alkali and xenon polarization near the cell exit than those present at the cell entrance, then the transport time of the gas to flow from entrance to exit should be considerably shorter than the time required for xenon to diffuse from exit to entrance. Finally, the time constant for alkali to transfer its polarization to xenon should be shorter than the time that xenon spends in contact with the alkali vapor. Polarization cells which have a length considerably greater than their transverse dimension can meet all of these criteria.

The next step as represented by block 58 is propagating laser light 48 in a direction 60, as seen in FIG. 1, preferably at least partially through a polarizing cell 32. Another step is directing the flowing mixture of gas 44 along a direction generally opposite to the direction of laser light propagation, as represented by block 62.

The next step is containing the flowing gas 44 mixture in the polarizing cell 32 as represented by block 64. Another step is immersing the polarizing cell 32 in a magnetic field as represented by block 66.

Another additional step is condensing the alkali metal vapor from the flowing mixture of gas in the laser light, as represented by block 68.

Some of the steps are optional. In addition, the order of steps can be initiated in other orders, although moving the flowing gas 44, as represented by block 56, propagating the laser 48, as represented by block 58, and immersing the magnetic field, as represented by block 66, must be concurrently active for the polarizing process 50 to occur.

Further description of various polarizing apparatus and methods is described in U.S. Pat. No. 6,949,169 B2, which is incorporated herein by reference.

Figure 3:
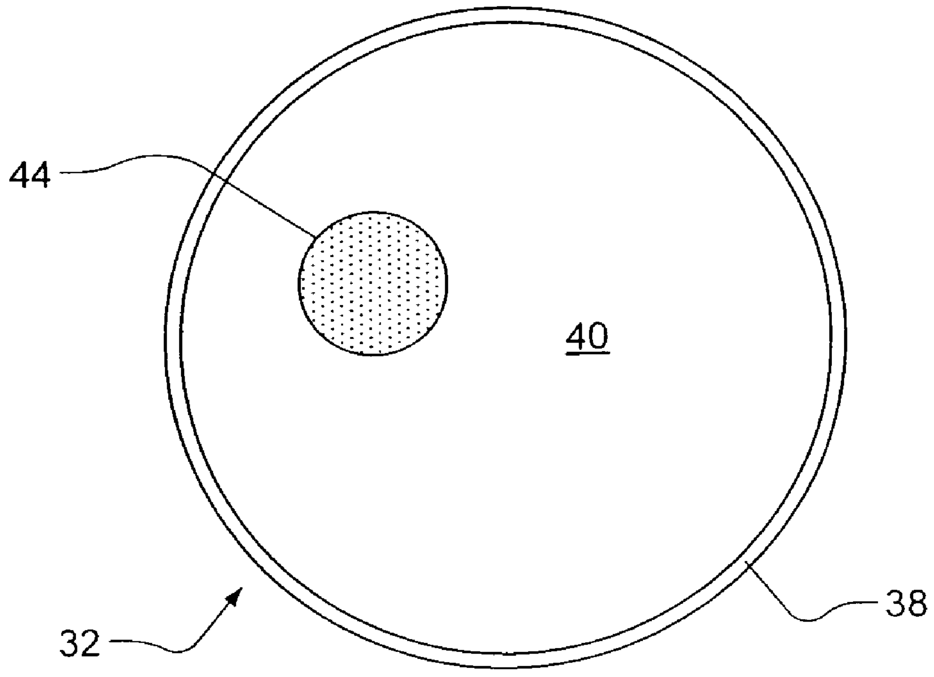
FIG. 3 shows a schematic transverse cross-section of a polarizing cell taken along the line 3-3 of FIG. 1.

FIG. 3 is a schematic cross-section of the polarizing cell 32 of the prior art taken along the line 3-3 in FIG. 1. The sectional view shows that the only surface in contact with the gas mixture and through which the heat of the gas mixture 44, which is flowing out of the page in FIG. 3 and represented by a series of dots, can be conducted is the circular side wall 38.

The present invention is a means for reducing the temperature of a gas mixture in a polarizing cell, thereby increasing the rate of production of polarized $^{129}$Xe. The present invention divides the polarizing cell into a large number of separate, thermally stabilized channels, using a thermally conductive material, such as copper. A number of potential drawbacks of this approach are as follows: The dramatically larger surface area increases the overall contribution of the layer of depolarized rubidium lining the surface. This will increase laser absorption along the surfaces. There will also be a depolarizing effect of copper on the $^{129}$Xe. However, the benefits of reducing the gas temperature outweigh these minor problems. Thus, a copper polarizing cell with channels with dimensions of the order 5 mm to 1 cm offers an improvement in polarization output.

Figure 4:
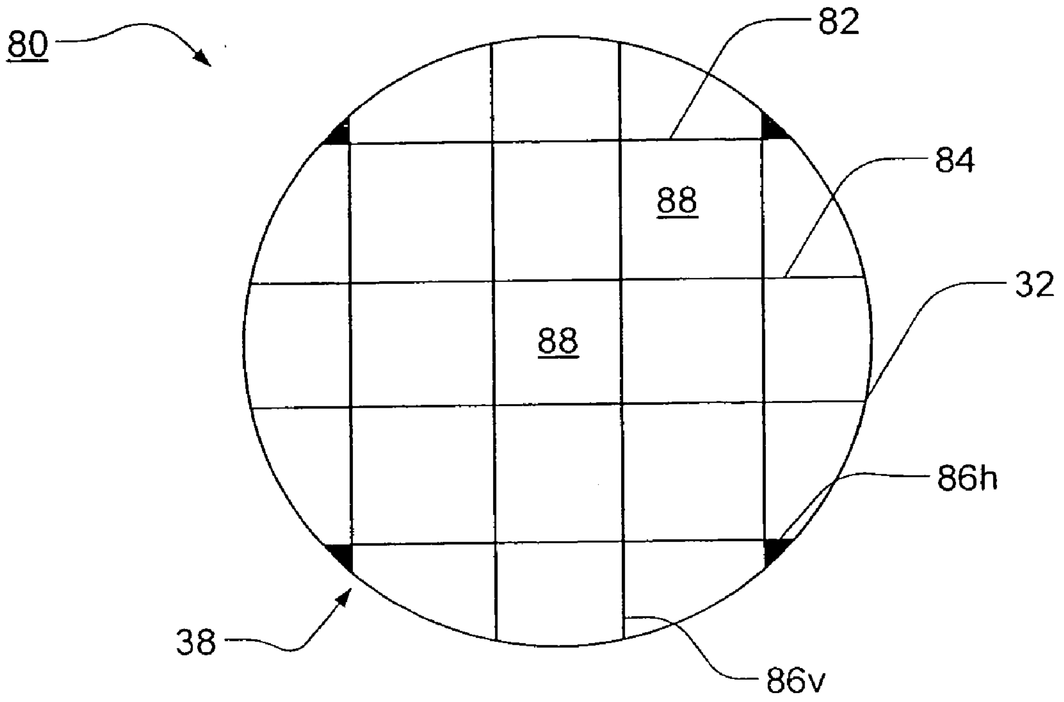
FIG. 4 shows a schematic transverse cross-section of a preferred embodiment of the polarizing cell of the present invention.

Referring to FIG. 4, a cross-section of the polarizing cell 32 of a polarizing apparatus 80 of the present invention. The polarizing apparatus 80 has a partitioning device 82 that subdivides the interior 40, as seen in FIG. 3, of the polarizing cell 32 into multiple channels, each illuminated by a part of the circularly polarized laser light 48. The use of such channels increases the surface area in contact with the gas mixture 44 and through which the heat of the gas mixture can be extracted.

Still referring to FIG. 4, the partitioning device 82 is a heat transfer device located in the interior 40 of the polarizing cell 32. The heat transfer device 82 has a column structure 84 of a thermally conductive material with a plurality of planar walls 86. The planar walls are shown in FIG. 4 extending horizontally 86*h* and vertically 86*v*. The arranged grid of the column structure 84 forms a plurality of rectangular channels 88.

In a preferred embodiment the thermally conductive material of the column structure 84 is copper or aluminum. The column structure 84 conducts heat from the gas mixture to the circular wall 38 of polarizing cell 32 that is also a thermally conductive material. The heat is then dissipated outside the polarizing cell 32.

Figure 4A:
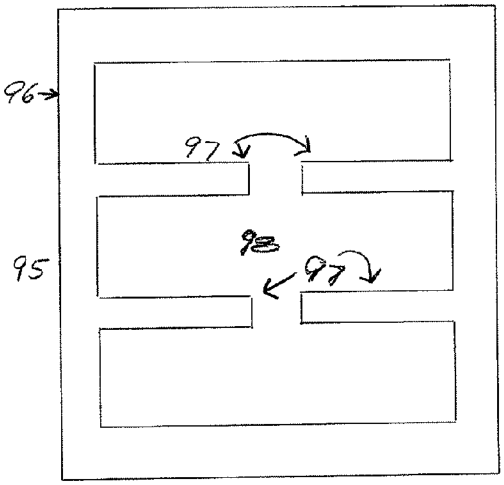
FIG. 4A shows a schematic transverse cross-section of a preferred embodiment of the polarizing cell of the present invention.
Figure 4B:
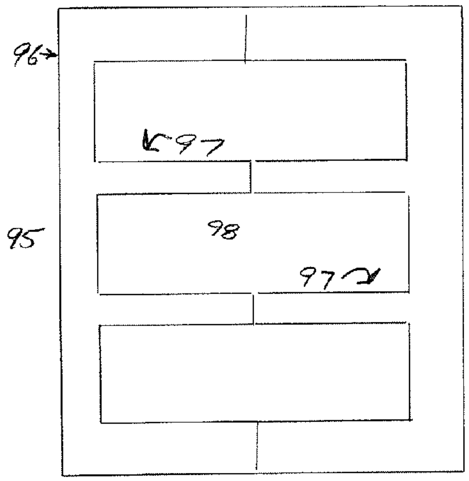
FIG. 4B shows a schematic transverse cross-section of a preferred embodiment of the polarizing cell of the present invention.

Referring to FIGS. 4A and 4B, which are cross-sections of polarizing cells 95 of the present invention, effective thermal management may also be accomplished by polarizing cells 95 with walls 96 made of a thermally conductive material and one or more fins 97 also made of a thermally conductive material that extend into the interior 98 of the polarization cell 95 to provide additional surface area for heat extraction. As shown in FIG. 4A, these fins 97 may extend partially into the interior 98 the polarization cell 95 illuminated by the laser. Alternatively, as shown in FIG. 4B, the fins 97 may extend fully into the interior 98 the polarization cell 95. Such a structure can more easily be manufactured by extrusion, possibly reducing costs and simplifying the fabrication. Since the polarization volume is generally at a pressure different than one-atmosphere, exterior walls would need to be thicker in the case of fins or one-dimensional plates than the case where the interior is interlaced with a two dimensional support structure.

Figure 5:
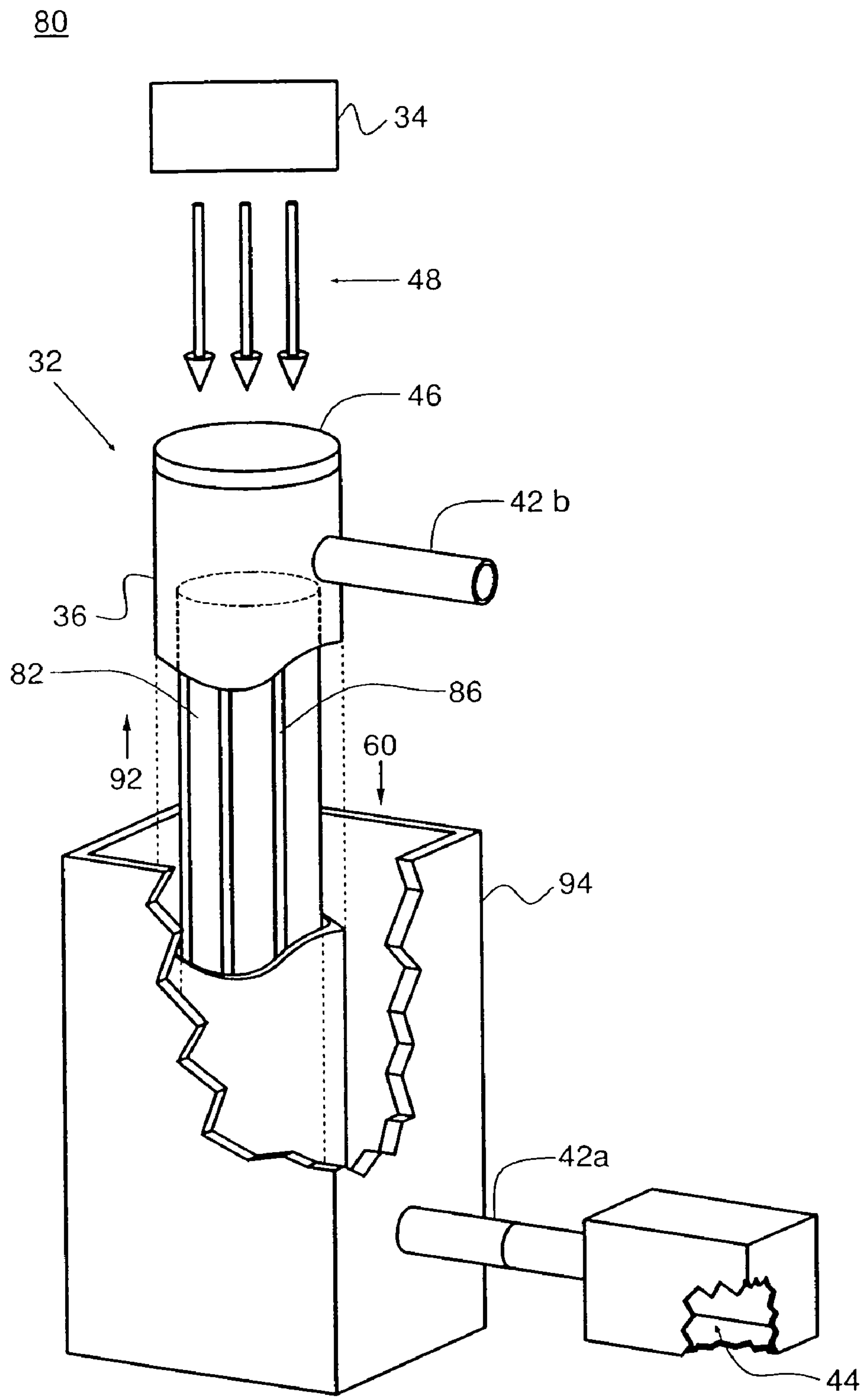
FIG. 5 is a layout of a preferred embodiment of the polarizing cell of the present invention with portions broken away.

Referring to FIG. 5, the polarizing apparatus 80 with a portion of the polarizing cell 32 broken away is shown. The polarizing apparatus 80 includes the polarizing cell 32 with the multiple openings, the entrance 42*a* and the exit 42*b*, and the at least one window 46 transparent to the laser light 34. The apparatus 80 further includes the flowing gas mixture 44, at least containing a polarizable nuclear species, at least one alkali metal vapor, and at least one quenching gas, moving through the cell 32 in a direction 92.

In one embodiment, the enclosure 36 of the polarizing cell 32 is formed of a high strength copper alloy 110.

Still referring to FIG. 5, the apparatus 80 further includes an oven 94 at least partially containing the polarizing cell 32. The apparatus 50 further includes an optical arrangement, a laser, 34 to propagate a laser light 48, which is substantially circularly polarized, at the absorption wavelength of the alkali metal vapor, through the transparent window 46 into the polarizing cell 32 in a direction 60 at least partially opposite to the direction 94 of the flowing gas mixture 44.

The polarizing cell 32 is sized in one embodiment so that it is more than five times greater in length diameter. In one embodiment, the cell can be ninety centimeters in length 62 and two centimeters in diameter 64.

Another embodiment of the apparatus 80 involves the oven 94 maintaining a temperature of over 150° C. in the lower portion of the polarizing cell 30.

Still referring to FIG. 5, a portion of the polarizing cell 32 is broken away showing the interior 40. The heat transfer device 82 with the column structure 84 is shown in a portion of the interior 40. The planar walls 86 of the device 82 defining the channels 88 extend upward from above the oven 94. The walls 86 of the column structure 84 end just prior to the exit 42*b* to allow the polarized gas mixture 44 to flow out of the polarizing cell 32.

Polarization of rubidium, an alkali metal, is stimulated by the laser light, and the rubidium atoms then transfer their polarization to the $^{129}$Xe atom through spin exchange. Throughout this procedure, the gas mixture is kept at relatively low pressure in order to promote the spin-exchange. The optimal gas pressure is determined by optimizing competing factors: 1) the spin-exchange rate due to molecule formation increases as the pressure decreases; 2) the pressure broadening of the absorption line improves the transfer of laser light to polarize the rubidium as pressure increases if the laser line is broad; 3) the nitrogen is required at pressures above 60 torr to quench the radiative decay, whose photons destroy the rubidium polarization; and 4) the addition of helium can be beneficial by broadening the spectral range of absorption and improving gas thermal conductivity.

Gas temperature is raised and regulated in a thermal bath in order to achieve an optimal rubidium vapor density in the flowing gas mixture. Since overall gas density as well as some fundamental spin exchange rates decrease with temperature, maintaining the gas at this temperature allows the polarizer to operate with maximum efficiency. However, $^{129}$Xe polarization at high laser power is limited by the heating of the gas mixture in the polarizing cell by the laser light. The gas mixture may reach temperatures in the range of 700° C. and above. Temperatures in this range can reduce the density and increase the flow rate of the gas mixture by a large factor. Also, temperatures in this range can reduce the fundamental spin exchange constant between rubidium and $^{129}$Xe. Moreover, it appears that rubidium polarization only requires gas mixture temperatures of approximately 160° C.

Figure 6:
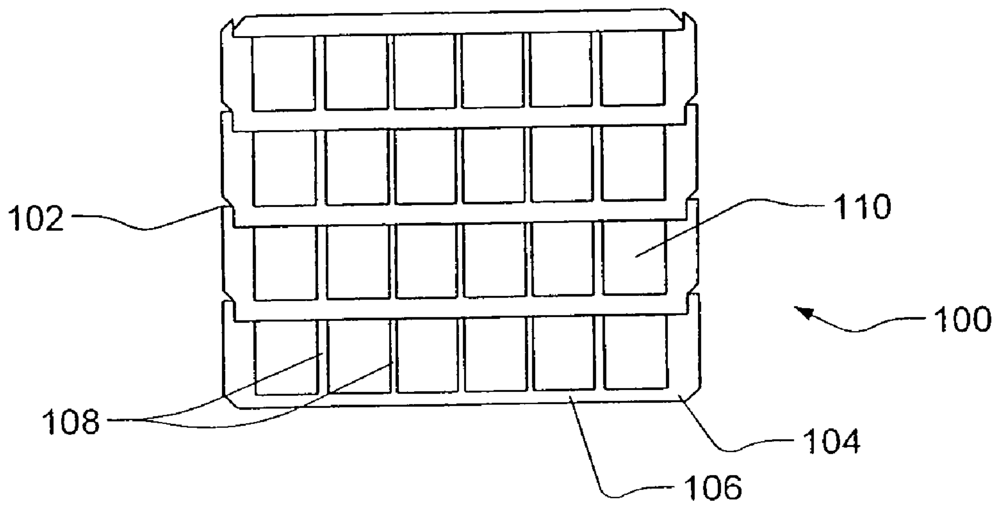
FIG. 6 is a schematic transverse cross-section of another preferred embodiment of the polarizing cell of the present invention.

Referring to FIG. 6, an alternative embodiment of a heat transfer device 100 is shown. The heat transfer device 100 is a rectangular polarizing cell 102. The cell 102 has a plurality of columns 104 with a base 106 and a plurality of legs 108. The base 106 and a pair of legs 108 in conjunction with a base 106 of another column forms a rectangular channel 110. The final cell 102 has only a base 106 to form the last set of rectangular channels 110.

Figure 7:
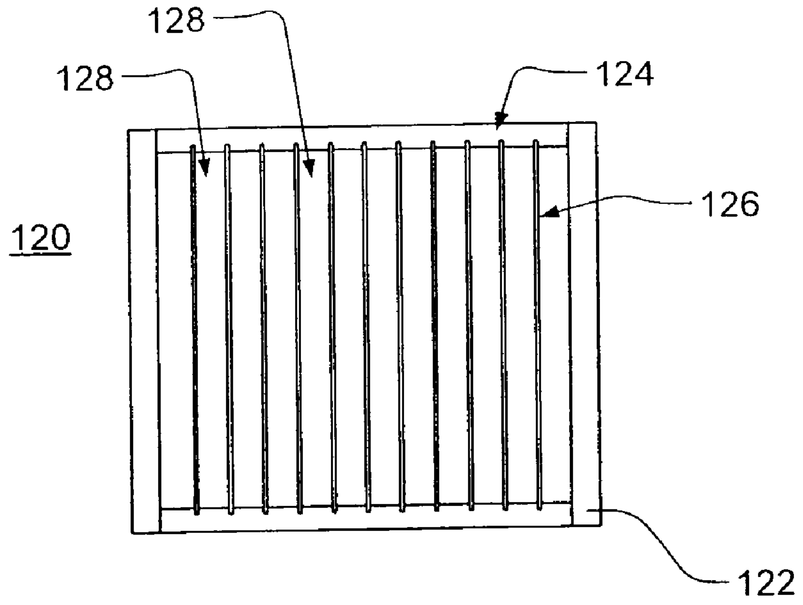
FIG. 7 is a schematic transverse cross-section of another preferred embodiment of the polarizing cell of the present invention.

Referring to FIG. 7, an alternative embodiment of a heat transfer device 120 is shown. The heat transfer device 120 is a rectangular polarizing cell 122. The cell 122 has a frame 124 and plurality of columns 126. The columns 126 and the frame 124 of the cell 122 define a plurality of slot-channels 128.

In a preferred embodiment of the embodiments described with respect to FIGS. 6 and 7, the walls of the polarizing cells and the columns are constructed of a thermally conductive material, such as copper.

In a preferred embodiment, the polarizing cell and columns are high strength 99.9% copper alloy 110. Although pure electronic grade oxygen-free copper has slightly higher thermal conductivity, its mechanical strength is lower by a factor 30% and is more expensive. The deflection of one side of the copper cell due to atmospheric forces will to be ~0.1 mm. Although this is well within alignment requirements, it, could cause the columns to buckle. For this reason the column thickness on the square-cell is maintained at 1 mm or greater, to allow structural support to the side. For the slot-cell, the side of the cell is pretensioned with a force equal to that of one atmosphere.

A key determinant in the selection of the configuration of the heat exchanger channels is the profile of the laser beam. If the beam is magnified in one dimension, the angular spread is reduced, and vice versa. For the square channels, a low angular spread in both dimensions is needed so the laser beam does not deposit a large fraction of its energy on the columns. In one embodiment, a laser was used with a beam with a large divergence (~4 degrees) along one axis (the “slow” axis) and a small divergence due to collimation by a microlens (1-2 milliradians) along the other axis (the “fast” axis). Because it is already collimated, the beam is expanded along the slow axis to illuminate the square channels. For the slot channel, laser beams are arranged differently so that the slow axis divergence is along the slot and the fast axis (already collimated by a microlens) is transverse to the slot.

Referring again to FIG. 4, the use of channels 88 formed by column structure 84 in the polarizing cell 32 acts to depolarize the rubidium and the $^{129}$Xe because of the additional surface area of the columns structure 84. There is, however, a net increase in the rate of production of polarized $^{129}$Xe at high laser power. The increase in the rate of production resulting from removing the heat from the polarizing cell 30 more than offsets the decrease due to the increased surface area in the polarizing cell 30.

Prior art teaches minimizing the surface area of a polarizing cell to minimize relaxation, and fabricating polarizing cell from materials that are known to minimize relaxation, namely glass. The polarizing cells and partitioning devices described here increase the surface area within the polarizing cell, preferring to extract heat rather than minimize relaxation and consist of a material with higher thermal conductivity, namely a metal such as copper or aluminum, rather than glass. Metal surfaces are known to be inferior to glass for retaining the polarization of the hyperpolarized gas. An embodiment of the polarizing cells and partitioning devices described herein comprise a polarizing cell with a portion of the interior surface of at least one of the side walls, and a portion of at least one of the walls of the partitioning device having a thin surface cladding of a different material that provides for retention of polarization that is better than metal. One implementation has a thin glass cladding, beneficially applied to as much of the surface as is practical, with especially high coverage where the hyperpolarization is highest: near the exit region of the polarizing cell. Glass is now produced in large thin sheets, primarily for flat panel televisions and computer screens. These sheets are typically composed of aluminosilicate glass, known to be a favorable surface for retaining polarization, and are available in thicknesses less than 0.5 mm, even to 0.1 mm or less. Cladding one or more interior surface of the heat transfer devices (whether extending partially into the interior, fully across the interior across one dimension, or fully across the interior in a two dimensional grid of the polarization cell) would improve the retention of polarization with only minimal compromise of the thermal stabilization of the flowing gases.

Figure 8:
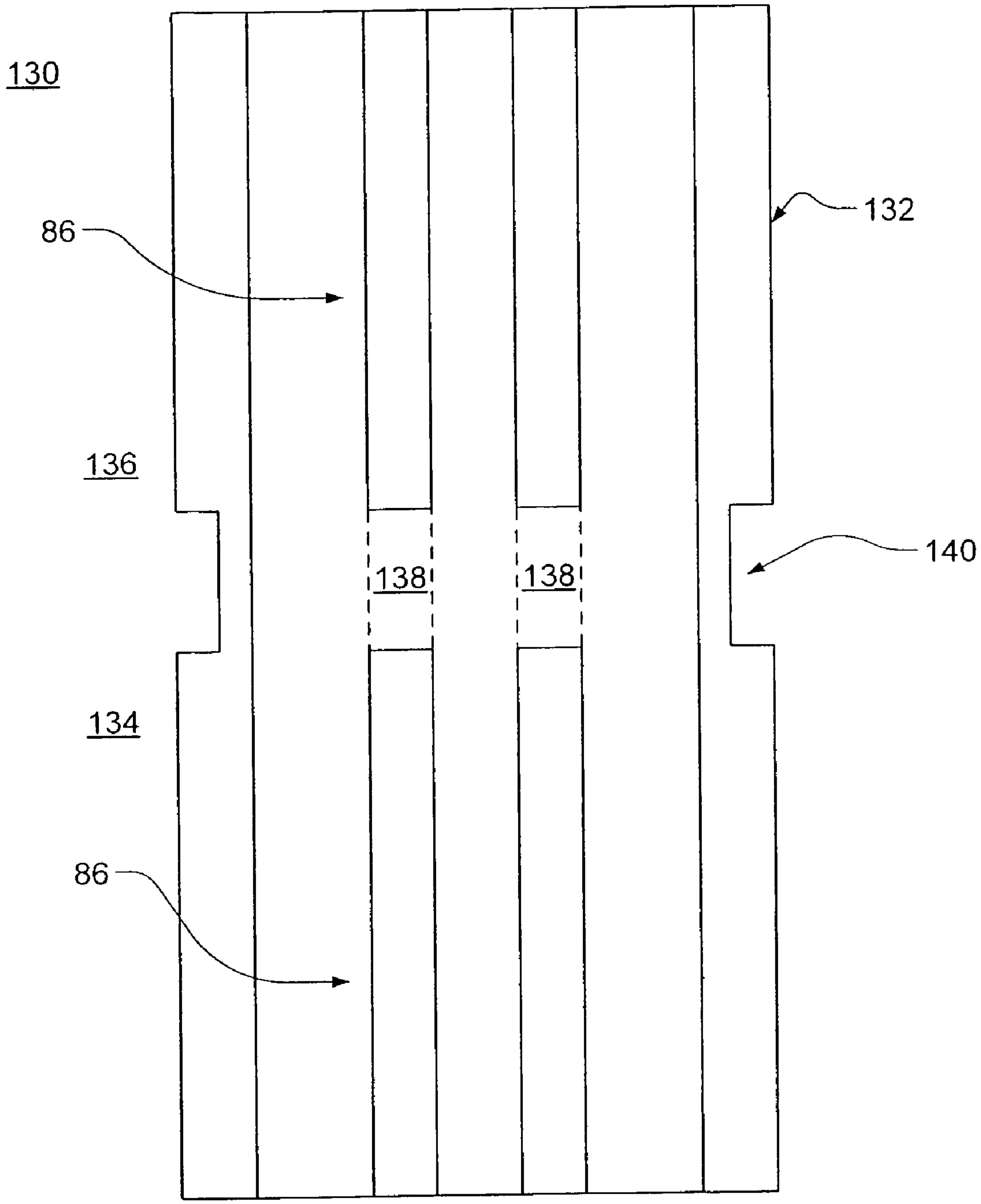
FIG. 8 is a schematic longitudinal cross-section of a preferred embodiment of the partitioning device of a polarizing cell of the present invention.

Referring to FIG. 8, an alternative partitioning device 130 is shown. The FIG shows the longitudinal design of the partitioning device 130 of the polarizing cell and its columns 132. The laser beam energy is preferentially deposited in the region where the laser beam is most intense and the rubidium vapor has high density. As shown in FIG. 8, this region is in the vicinity of the top of a lower section 134 of the partitioning device 130 (the polarization region) as well as a bottom of an upper section 136 (the condensation region). The transverse profile of the high conductivity material of the columns 132 is designed to transfer heat from the gas to a temperature stabilized environment, this stabilization is facilitated by the capability of the columns to transfer heat longitudinally along the length of the column. While spreading the heat over a large surface area is beneficial for both the lower section and the upper section separately, it is not beneficial for heat to be transferred from the lower section 134 to the upper section 136.

A transition region 138 of reduced thermal conductivity is employed between the polarization region, the lower section 134, and the condensation region, the upper section 136, to minimize the heat flow between these regions. The goal of this thermal barrier is to allow the lower, or polarization, region 134 to have high longitudinal thermal conductivity to spread the heat from where it is maximally deposited uniformly over the lower, or polarization, regions and separately to have the upper, or condensation, region 136 serve as a region for rubidium condensation with a uniform temperature.

In order to implement such a thermal barrier, much of the cross sectional area of the high conductivity material can be interrupted. This can be accomplished by implementing the transition region 138 through placing a small gap in the columns 132 so that the top region 136 and lower region 134 are not connected. The partitioning device 130 has the columns 132 thinned at the transition region 138 to minimize the heat transfer. The cell 60, however, must be hermetically sealed, and therefore, its walls physically connected. One preferred embodiment reduces the longitudinal conductivity of the cell walls by machining away much of the high conductivity material, leaving only a thin section 140. Ideally, material would be removed from the outside of the cell so that the inner profile of the cell maintains its profile. The enclosure 36, such as shown in FIG. 5, needs to be hermetically sealed, and therefore, its walls physically connected. However, to create a thermal barrier on the enclosure 36 also, the walls may be machined away leaving therefore a thin section similar to that shown in the columns. Ideally, the material would be removed from the outside of the cells so that the inner profile of the cell maintains its profile.

Figure 9:
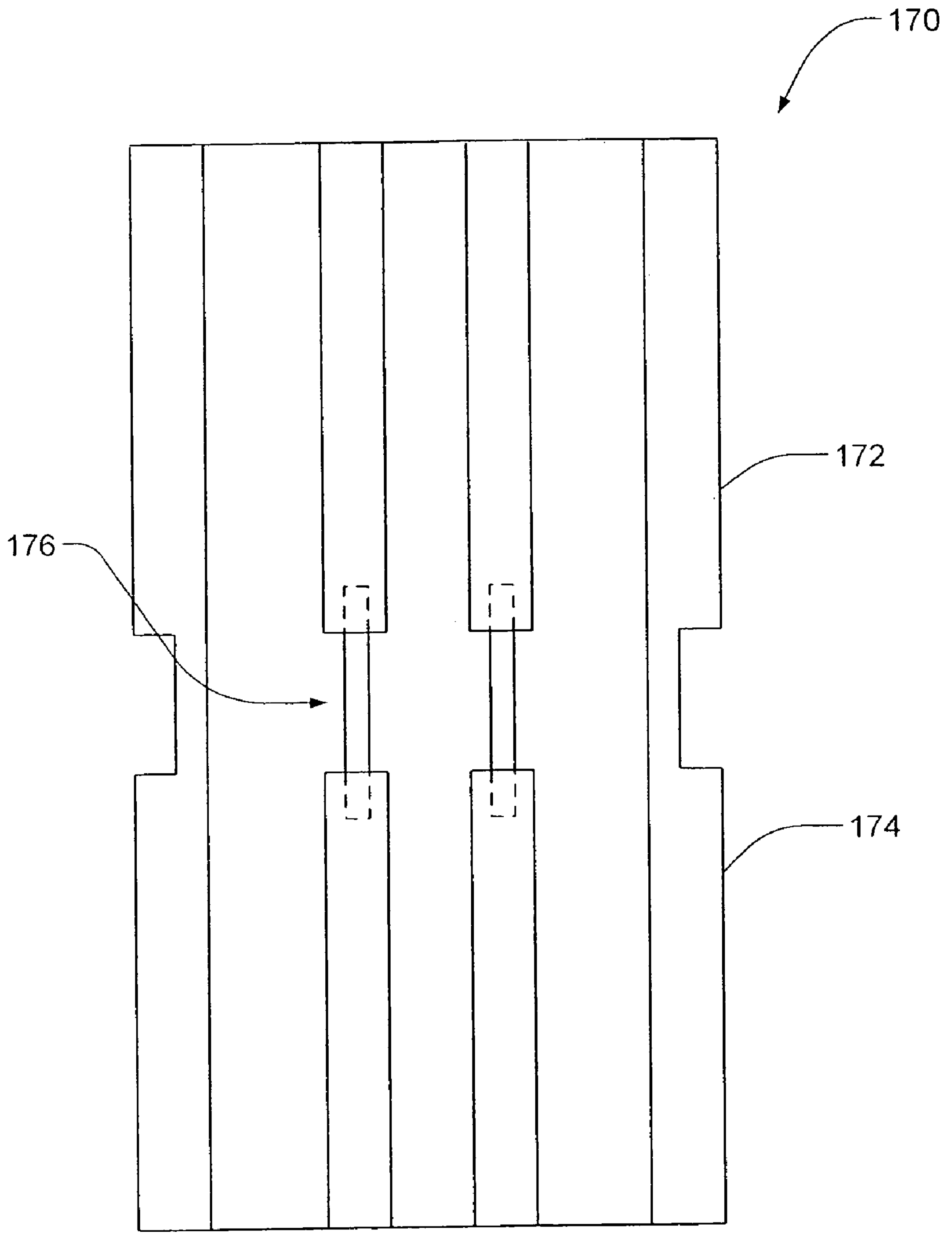
FIG. 9 is a schematic longitudinal cross-section of another preferred embodiment of the present invention.

As shown in FIG. 9, an alternative embodiment is shown. A thermal break to join an upper section 172 of the cell 170 and a lower section 174 with a transition section 176 fabricated from a material of lower thermal conductivity. The thickness of this section is a compromise between mechanical stability and thermal conductivity. The length of this insertion can then be chosen to maintain the heat transferred from upper section 172 to the lower section 174 at acceptable values. In this embodiment, non-magnetic stainless steel sections of 9 cm long and 0.1 cm thick, embedded in the top and bottom sections by 4 cm, leave a 1 cm gap between the upper and lower copper sections.

Figure 10:
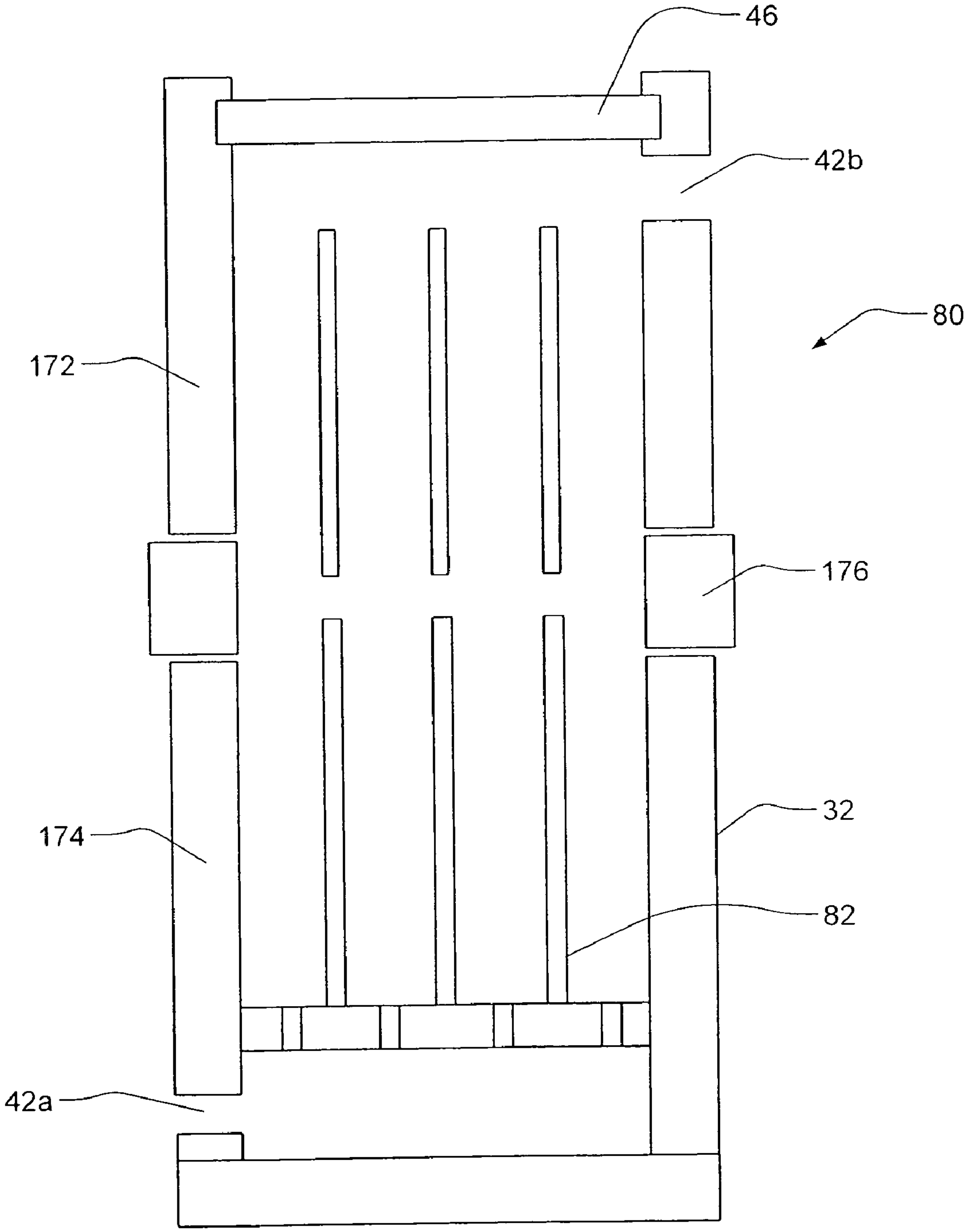
FIG. 10 is a schematic of a polarizing cell with a partitioning device of the present invention.

Referring to FIG. 10, a schematic of a polarizing apparatus 80 with a polarizing cell 32 with a partitioning device 82 is shown. The polarizing cell 32 has an orifice plate 180 for directing the gas mixture 44 into the channels 88 of the partitioning device 82. The enclosure 36 of the polarizing cell has a transition section 176 formed of a material of low thermal conductivity such as glass or titanium.

Figure 11:
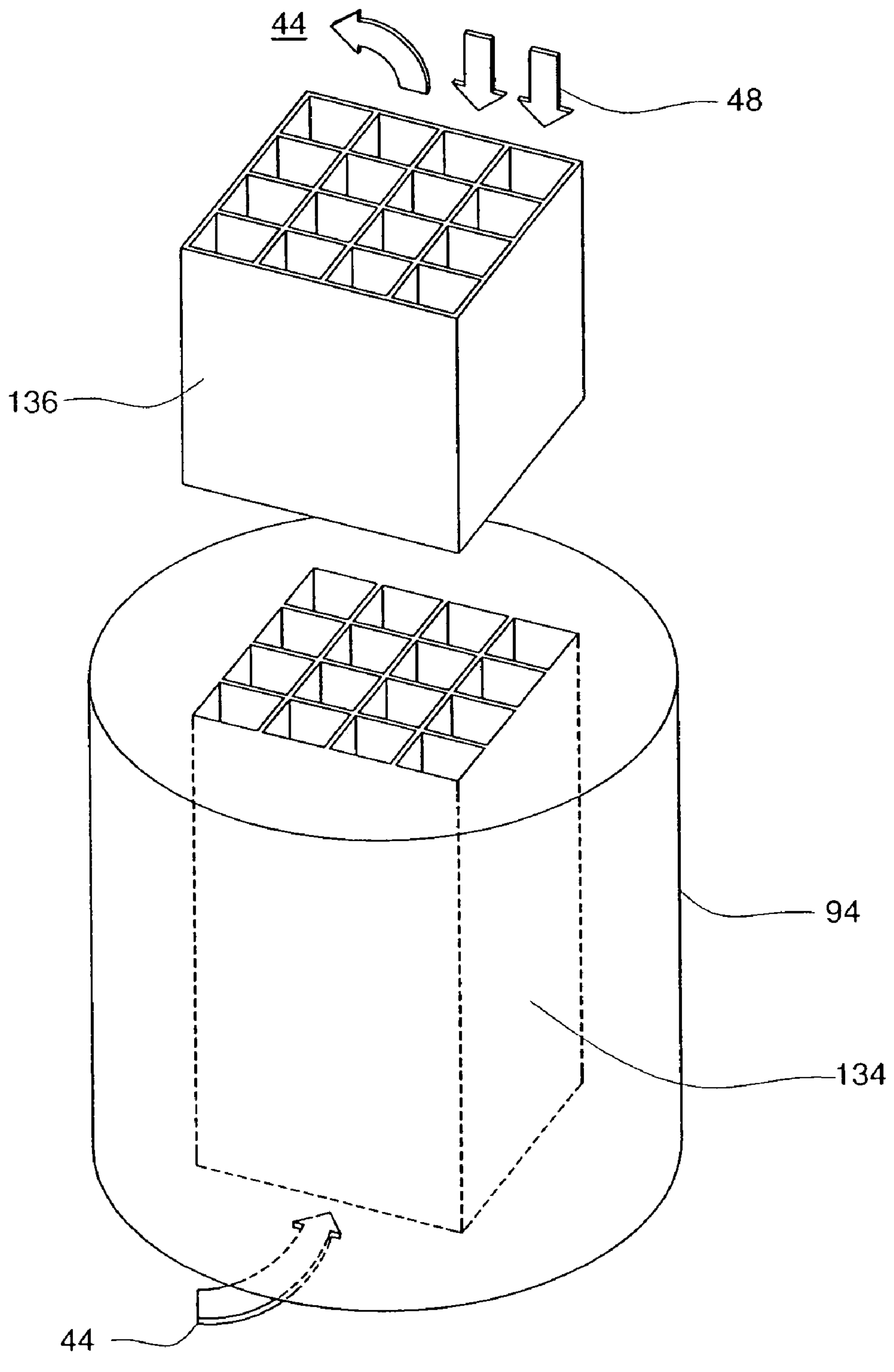
FIG. 11 is a graphical representation of the flow of the gas mixture and the direction of propagation of the laser light.

Referring to FIG. 11, a graphical representation of the flow of the gas mixture and the direction of propagation of the laser light is shown. The polarized laser light 48 moves in the downward direction in the FIG. The gas mixture 44 moves upward in the FIG. The enclosure 36 of the polarizing cell 32 is not shown in the figure for clarity. The flowing gas mixture is heated in a helical pre-saturator, not shown. The lower portion is the polarizing section. The lower portion sits in an oven 94 or oil bath that is maintained at the optimal operating temperature of the gas mixture 44. The partitioning device 82 lower portion 134 is used to transfer the heat to and from the gas mixture 44 to maintain its temperature at the optimal polarizing temperature. The transition region 138 is represented by the missing portion between the lower portion 134 and the upper section 136. In the upper section 136, condensation, region 136 serves as a region for rubidium condensation with a desire to remove heat from the gas.

An assembled cell consists of two copper sections, a polarization section and condensing section, a stainless "waist", and an exit port and valve. The components are assembled in steps using solder at different temperatures. We have identified three solders that an experienced heat-treatment company will use, and guarantee the vacuum integrity of the assembly: Au:Ge, Au:Sn, and Ag:Sn. These solders have reflow temperatures at 360° C., 280° C., and 221° C. The main copper assemblies are assembled at 360° C. using Au:Ge. The two sections are joined with the stainless waist using Au:Sn at 280° C. without reflowing the previous assembly joints, and the exit ports are added using silver-tin at 221° C.

It should also be noted that the accumulation of rubidium in the rubidium condensation section of a polarizing cell may be the determinant of the lifetime of the cell. The installation of more than one thermal break longitudinally and then the external installation of thermal shorts bridging all but one of these thermal breaks, would allow external control over where the polarization region stops and the condensation region starts. Hence, this would determine where the rubidium is deposited inside the channels. It would then be possible to begin operation with a longer polarization region and a shorter condensation region, and after some period of operation, to adjust the thermal shorts such that an additional longitudinal portion of the cell was removed from the polarization region and added to the condensation region. This modification would sequester the deposited rubidium, and expose a new region for fresh depositing of the rubidium, extending the operational life of the polarizing cell.

It should also be noted that as the collimated laser beams pass through the channels polarizing the unpolarized rubidium atoms, they are also attenuated by unpolarized rubidium atoms. The concentration of unpolarized rubidium atoms is greater near the walls of the columns. After propagating through some length of channel, the laser beams become less intense near the walls of the columns and less capable for polarizing rubidium there. Thus, implementing steps in the wall thickness of the columns maintains the gas mixture in the regions of the cell that are illuminated. Channels are slightly smaller further from the laser to constrain the flow of gas to the region of the channel that is fully illuminated.

While the principles of the present invention have been described herein, it is to be understood by those skilled in the art that this description is made only by way of example and not as a limitation as to the scope of the present invention. Other embodiments are contemplated within the scope of the present invention in addition to the exemplary embodiments shown and described herein. Modifications and substitutions by one of ordinary skill in the art are considered to be within the scope of the present invention.

While one type of polarizing cell has been described with respect to the instant invention, it is recognized that other polarizing cells can include thermal partitioning devices described above.

What is claimed is:

1. A polarizing cell comprising:

an enclosure having one or more side walls defining an interior and an interior surface of each of the side walls, at least a pair of openings including an entrance and an exit to allow a gas mixture to pass through the interior of the enclosure;

at least one window transparent to laser light; and at least one partitioning device carried in the interior of the enclosure for transferring heat from a gas mixture to the one or more side walls, wherein the partitioning device is a column structure having a plurality of planar walls defining a plurality of channels to allow a gas mixture to pass through.

2. The polarizing cell of claim 1 wherein at least one of the side walls of the enclosure and the at least one partitioning device are made of a thermal conductive material comprising copper or aluminum.

3. The polarizing cell of claim 2 wherein a portion of the interior surface of the one or more side walls of the enclosure has a thin surface cladding of glass.

4. A polarizing cell comprising:

an enclosure having one or more side walls defining an interior and an interior surface of each of the side walls, at least a pair of openings including an entrance and an exit to allow a gas mixture to pass through the interior of the enclosure;

at least one window transparent to laser light; and at least one partitioning device carried in the interior of the enclosure for transferring heat from a gas mixture to the one or more side walls, wherein the partitioning device is a structure having at least one fin with walls projecting into the interior of the polarizing cell.

5. The polarizing cell of claim 4 wherein a portion of the walls of the at least one partitioning device are made of a thermal conductive material comprising copper or aluminum, and has a thin surface cladding of glass.

6. A polarizing process comprising:

moving a flowing mixture of gas, comprising a polarizable nuclear species and vapor of at least one alkali metal;

propagating laser light in a direction that intersects the flowing gas mixture;

containing the flowing gas mixture in a polarizing cell having one or more side walls defining an interior and an interior surface of each of the side walls;

stabilizing the temperature of the flowing gas mixture by using a partitioning device for transferring heat, wherein the partitioning device is a column structure having a plurality of planar walls defining a plurality of channels to allow the flowing gas mixture to pass through the polarizing cell; and immersing the polarizing cell in a magnetic field.

7. The process of claim 6 wherein at least one of the side walls of the polarizing cell and the at least one partitioning device are made of a thermal conductive material comprising copper or aluminum.

8. The process of claim 6 wherein a portion of the interior surface of the one or more side walls of the polarizing cell has a thin surface cladding of glass.

9. A polarizing process comprising:

moving a flowing mixture of gas, comprising a polarizable nuclear species and vapor of at least one alkali metal;

propagating laser light in a direction that intersects the flowing gas mixture;

containing the flowing gas mixture in a polarizing cell having one or more side walls defining an interior and an interior surface of each of the side walls;

stabilizing the temperature of the flowing gas mixture by using a partitioning device for transferring heat, wherein the partitioning device is a structure having at least one fin with walls projecting into the interior of the polarizing cell; and immersing the polarizing cell in a magnetic field.

10. The process of claim 9 wherein a portion of the walls of the at least one partitioning device are made of a thermal conductive material comprising copper or aluminum, and has a thin surface cladding of glass.

* * * * *